United States Patent
Lenez et al.

(10) Patent No.: US 8,045,653 B2
(45) Date of Patent: Oct. 25, 2011

(54) METHOD AND SYSTEM FOR CONTROLLING A RECEIVER IN A DIGITAL COMMUNICATION SYSTEM

(75) Inventors: Thierry Lenez, Sevran (FR); Patrice Lenez, legal representative, Sevran (FR); Jean-Benoit Pierrot, Saint-Egreve (FR); Olivier Isson, La Tronche (FR)

(73) Assignees: STMicroelectronics S.A., Montrouge (FR); Commissariat a l'Energie Atomique, Paris (FR)

( * ) Notice: Subject to any disclaimer, the term of this patent is extended or adjusted under 35 U.S.C. 154(b) by 599 days.

(21) Appl. No.: 10/572,295

(22) PCT Filed: Sep. 15, 2004

(86) PCT No.: PCT/EP2004/012184
§ 371 (c)(1),
(2), (4) Date: Jul. 9, 2007

(87) PCT Pub. No.: WO2005/027400
PCT Pub. Date: Mar. 24, 2005

(65) Prior Publication Data
US 2008/0002798 A1 Jan. 3, 2008

(30) Foreign Application Priority Data
Sep. 15, 2003 (FR) ...................................... 03 10808

(51) Int. Cl.
*H04L 27/06* (2006.01)
(52) U.S. Cl. ....................................... 375/342; 375/316
(58) Field of Classification Search .................. 375/316, 375/342, 343, 354, 260, 355, 365, 371
See application file for complete search history.

(56) References Cited

U.S. PATENT DOCUMENTS

| 7,254,163 B2* | 8/2007 | Chen et al. ..................... 375/150 |
| 2004/0105512 A1* | 6/2004 | Priotti ............................ 375/340 |
| 2004/0170237 A1* | 9/2004 | Chadha et al. ................. 375/343 |

FOREIGN PATENT DOCUMENTS

| EP | 1282258 | 2/2003 |
| WO | WO 02062030 | 8/2002 |

(Continued)

OTHER PUBLICATIONS

Muller-Weinfurtner S H "On the optimality of metrics for coarse frame synchronization in OFDM: a comparison", Indoor and Mobile Radio Communications, 1998. The Ninth IEEE International Symposium, pp. 533-537, New York, NY.

(Continued)

*Primary Examiner* — Shuwang Liu
*Assistant Examiner* — David Huang
(74) *Attorney, Agent, or Firm* — Lisa K. Jorgenson; Stephen Bongini; Fleit Gibbons Gutman Bongini & Bianco P.L.

(57) ABSTRACT

Detection method and device for a receiver in a digital communication system designed to process a frame comprising a periodic sub-set of length n, said method comprising the following steps:—determining a first vector u having a length n;—determining a second shifted vector v;—calculating a correlation function between said first and second vectors;—calculating a quadratic error function between said first and second vectors;—calculating a first cost function that is a linear combination of both preceding functions and, according to the sign of the result,—calculating a second cost function of frame beginning estimate; and—starting the communication system receiver.

12 Claims, 4 Drawing Sheets

FOREIGN PATENT DOCUMENTS

WO    WO 02062030 A1 *  8/2002

OTHER PUBLICATIONS

Prasetyo B Y et al. "Fast burst synchronisation technique for OFDM-WLAN systems", Institution of Electrical Engineers, GB, vol. 147, pp. 292-298, Oct. 2000.

Schmidl T M et al. "Robust frequency and timing synchronization for OFDM", IEEE Transactions on Communications, vol. 45, pp. 1613-1621, New York, NY, Dec. 1997.

International Search Report and Written Opinion dated Jan. 31, 2005.

French Search Report dated Apr. 15, 2004 for FR 0310808.

* cited by examiner

METHOD AND SYSTEM FOR CONTROLLING A RECEIVER IN A DIGITAL COMMUNICATION SYSTEM

TECHNICAL FIELD OF THE INVENTION

The present invention relates to signal processing in digital communication receivers in general, and more particularly to a method and a system for controlling a receiver in a digital communication system.

BACKGROUND ART

In any digital communication system, and in particular in wireless communication systems, the receiver is equipped, amongst other things, with a detection mechanism and a frame start time estimation mechanism.

Detection is a well-known issue in the state of the art. It is an operation that consists in processing a signal received from a transmitter in order to determine if this signal is carrying useful information. Referring to FIG. 1, there is shown a receiver 1 receiving a signal that is also transmitted to a cost function F1 computation block 2. The result of the cost function is transmitted to a comparator 3 that compares this value with the value of a preset threshold K. The result of the comparison is then used, as represented in FIG. 2, to discriminate the signal from the noise and to activate receiver 1.

Consequently, threshold K is especially important since it directly determines the enabling of receiver 1. Moreover, the threshold affects the performance of the detector and in particular the probability of a detection error, be it false alarm (FA)—i.e. the detection of a signal whereas there is only noise—or a miss detection (absence of signal detection).

In a more formal way, let us adopt the following expression conventions:
H0: hypothetical case where there is only noise
H1: hypothetical case where both signal and noise are present
D0: hypothetical case where there is detection of noise only
D1: hypothetical case where there is detection of signal and noise A traditionally used cost function consists in establishing a correlation between various samples of the received signal, the probability law of the cost function being different according to whether the hypothetical case H0 or H1 applies. If one considers the characteristic curves of the probability density function of this cost function in the two possible cases (FIG. 3), the traditional method consists in setting a threshold K that will make it possible to decide between one and the other hypothesis. The probability of a detection error can then be written as follows:

$$P[(D_1, H_0) \cup (D_0, H_1)] = p(Fc > K, n) + p(Fc < K, s)$$

It can be shown that the intersection of both curves determines the value of an optimal threshold K that makes it possible to minimize the sum of the above terms. It is thus necessary, in the receiver, to adjust threshold K used in the mechanism of FIG. 1 in order to set its value to the optimal threshold because the threshold directly determines the performance of the detector. If a threshold is set too low the first term of the above equation will increase—i.e. the probability of false alarm—and, if the threshold is set too high, then the other term will increase, thus increasing the risk of signal miss detection. Only the optimal value, represented in FIG. 3, makes it possible to minimize the mathematical expression above thus ensuring to obtain detection with as few errors as possible.

In practice, the signal and noise probability density are not precisely known and thus the value of threshold K must be approximately set by empiric means.

As a result, the detector's performance is poor.

Moreover, It can be noted that threshold K directly affects the operation known as frame start time estimation, namely determining the exact moment when the signal becomes informative. Once the presence of a periodic signal has been detected, it is important to be able to identify the beginning of the frame. Such estimation must allow the receiver to precisely target the first symbols received from the transmitter. If threshold K is empirically set too low, then the receiver will have to manage a lot of false detections and, in the opposite case, the signal will not be detected anymore. Thus, the detection operation indeed has a direct influence on the estimation operation.

Therefore, with known techniques one is confronted with the insurmountable problem of having to precisely determine the threshold K to use in a detector. In practice, it is impossible to determine an optimal threshold because of the difficulty of knowing precisely the distribution laws and their characteristics in relation to the signal and noise in a concrete case. Then there is often no other option than to set threshold K in an empirical and approximate way, by studying the behavior of the channel.

This is the reason why, regarding detection or estimation, known receivers show limited performance whatever the particular technique employed: MC (Maximum Correlation), Minimum Mean Square Error (MMSE), SCHMIDL, for all these techniques start from the postulate that the threshold must be set to its optimal value. The problem common to all these techniques lies in the importance of appropriately setting the value of threshold K.

It would be desirable to find an alternative technique and to be freed from having to determine threshold K for carrying out detection and more generally for controlling a receiver in a digital communication system.

SUMMARY OF THE INVENTION

The object of the present invention is to propose a structure that is an alternative to known techniques for controlling receivers in digital communication systems.

Another object of this invention consists in proposing a control method for a receiver having to process a frame comprising a periodic sub-set, where it is not necessary any more to determine, as in known techniques, a threshold K discriminating between signal and noise.

A third object of this invention consists in providing an effective detector applicable to wireless communication techniques of the 802.11-type.

The invention achieves these objects by means of a method for controlling a digital communication system receiver intended to process a frame comprising a periodic sub-set. The method has the following steps:
  determining a first vector u having a length n;
  determining a second vector v shifted by a whole number of periods;
  calculating a correlation between said first and second vectors;
  calculating a quadratic error between said first and second vectors;
  calculating a first cost function that is a linear combination of both preceding calculations and, according to the sign of the result, calculating a second cost function representative of the beginning of frame estimate and determining its minimal value corresponding to a beginning of frame;

starting the communication system receiver.

Preferably, estimating the beginning of frame is carried out by using the mean quadratic error between deshifted vector u and vector v according to the formula:

$$||e^{-j\Delta f 2\pi L}u-v||^2$$

where L is the number of samples separating vectors u and v.

In a preferred embodiment, the method comprises the following steps:

calculating the scalar product of a first vector resulting from an observation window having a length equal to the length of said periodic set and of a second vector v shifted by a whole number of periods;

calculating the phase drift $\Delta F$ resulting from the transmit and receive oscillators according to the formula:

$\Delta F = \alpha \arg(<u,v>)$ with $\alpha = 1/2\pi n T$ where $T$ is the clock period;

calculating the mean quadratic error according to the formula:

$$||e^{-j\Delta f 2\pi L}u-v||^2$$

L being the number of samples separating the vectors u and v;

calculating a first cost function F1 that is a linear combination of both preceding calculations;

comparing F1 compared to 0 and, according to the result, calculating a second performance F2 used to estimate the beginning of frame and determining its minimal value corresponding to a beginning of frame;

starting the receiver when the result is positive.

Thus, it is not necessary anymore to set a threshold to use as comparative data with the cost function traditionally used in known systems. With the previously defined cost function, checking the sign of the result is enough to determine whether it is necessary to start the receiver.

The method is especially adapted to periodic preamble communications and therefore to 802.11-type communications.

The invention also provides a receiver control device for a periodic communication system.

BRIEF DESCRIPTION OF THE DRAWINGS

Other features, objects and advantages of the invention will be made clear when reading the following description and drawings, only given by way of nonrestrictive examples. In the accompanying drawings.

DESCRIPTION OF A PREFERRED EMBODIMENT

Figure 1:
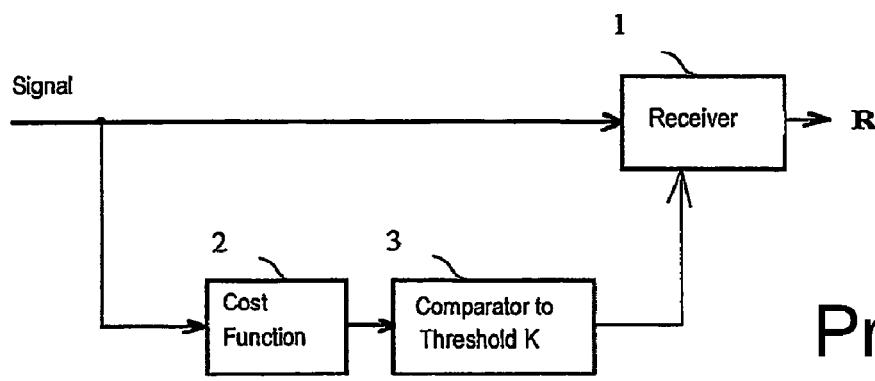
FIG. 1 illustrates a known architecture of a detection system.
Figure 2:
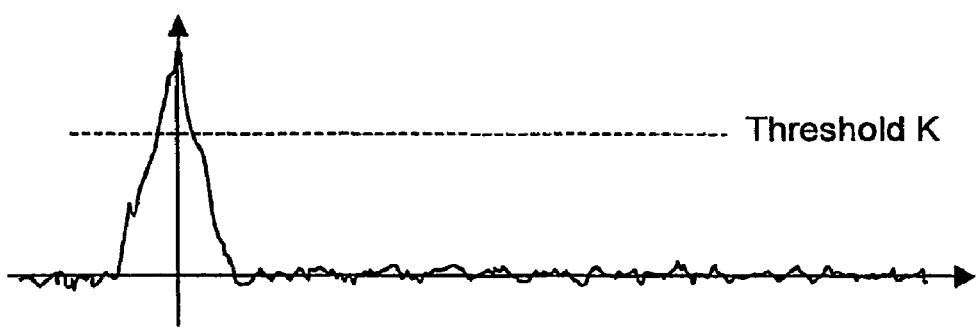
FIG. 2 illustrates the principle of detection in known systems from a cost function F1.
Figure 3:
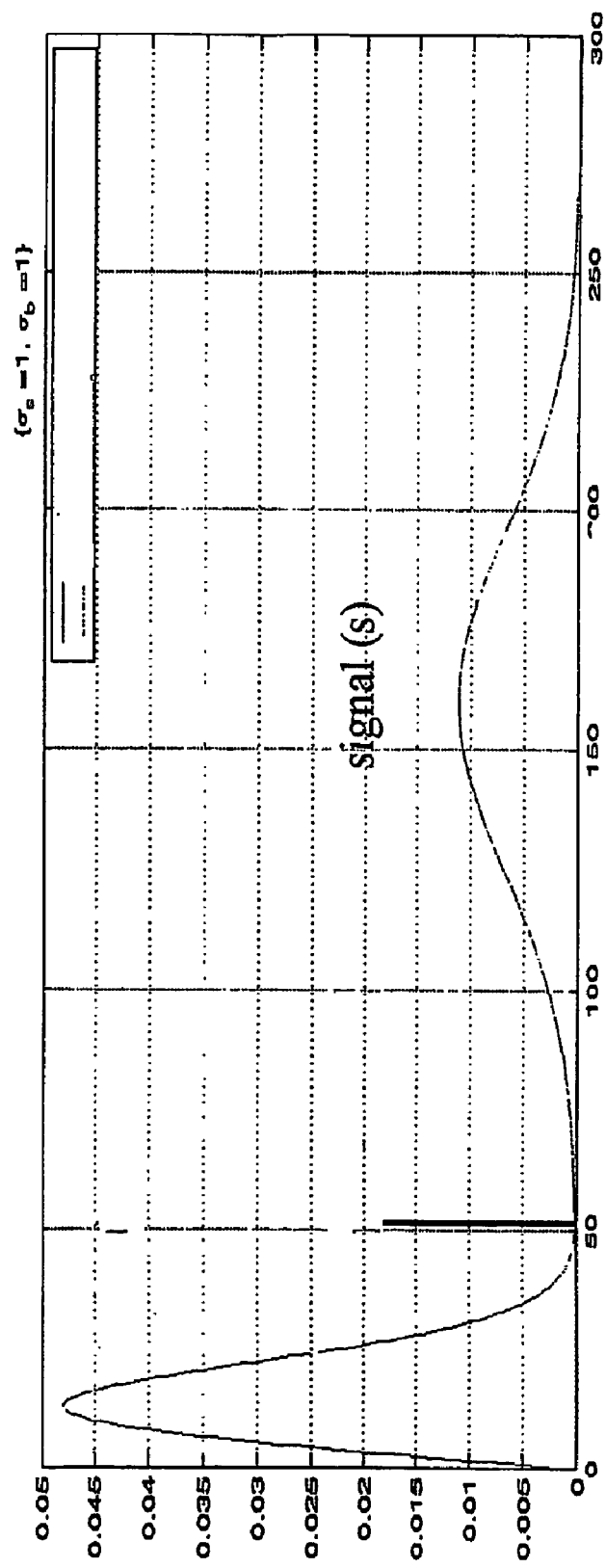
FIG. 3 illustrates typical curves representative of the noise and signal's probability density functions.
Figure 4:
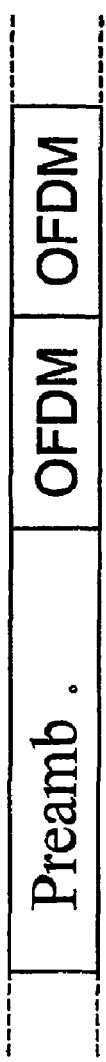
FIGS. 4 and 5 depict the structure of a periodic pattern and in particular in the 802.11 communication technique.
Figure 5:
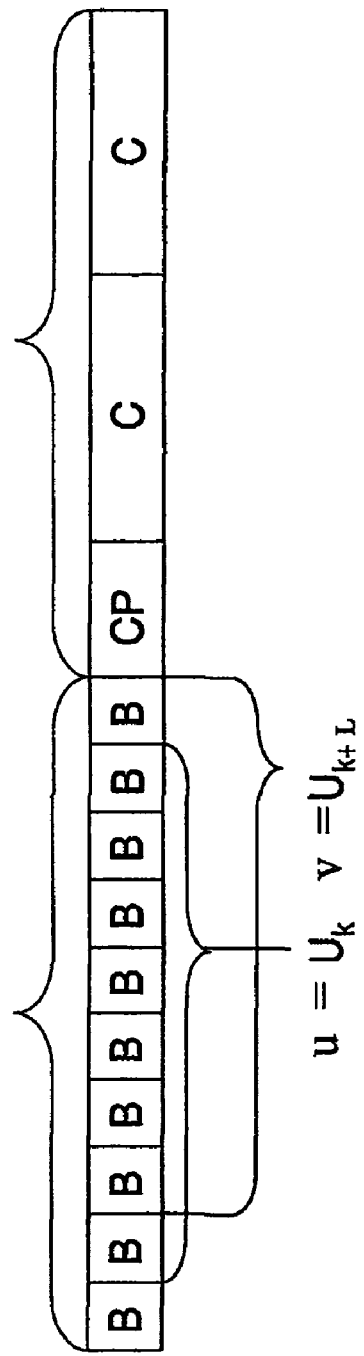

The detection method according to the invention will now be described. The method is particularly adapted to realize a wireless communication technique such as the one known as 802.11. FIGS. 4 and 5 illustrate the structure of a frame comprising a short preamble (made up of periodic patterns B) and a long preamble (made up of patterns CP and C). Periodic pattern B makes it possible to carry out detection and estimation operations without using any other information (as can be obtained through a learning process).

Generally, a frame comprises a repetition of periodic elements B having a length of n symbols belonging to a given alphabet.

Let us consider a vector u (also represented by Uk in the figure) that corresponds to a group of periodic elements B and v (also represented by Uk+L in the figure), which is the element shifted by a whole number of periods. It should be noted that u and v can constitute any regrouping of a plurality of the periodic sub-sets noted as B in drawing 5.

Generally, the length of the periodic window (B on FIG. 5) is set so that the impulse response of the channel is absorbed, so that the received signal obtained is a periodic signal. If the length of the channel impulse response is set to 4, element B will comprise at least 4 pieces of information. These values are only used by way of example and are by no means restrictive.

In the traditional approach, the detection operation is based on calculation of a correlation between vectors u and v, which calculation is based on the scalar product $<u, v>$. In the end the detection operation is followed by a comparison with the value of the preset threshold K.

In theory, the scalar product $<u, v>$ has a maximum value when the vectors are suitably synchronized but, in practice, it is necessary to take into account the disturbances introduced by the channel and the effect resulting from the automatic gain control (AGC), these two factors being the reason why, in the receiver, vectors u and v do not have the same module and, consequently, their scalar product does not reach a maximum value when both vectors are aligned.

In the approach proposed by the invention, carrying out the detection operation and finally the receiver control operation is done by using a correlation calculation adjusted by taking into account the modules of both vectors u and v in order to take into account the disturbance from the channel.

In a first approach, the correlation is calculated from normalized values of both vectors, according to the formula:

$$\frac{<u,v>}{||u||||v||} \quad (1)$$

This first approach however presents the disadvantage of introducing division operations that turn out to be expensive to implement.

In a second approach, which is the preferred embodiment, a less complex calculation in term of architecture is done, which is based on a first mean cost function F1 that is the linear combination of a correlation calculation based on the scalar product $<u, v>$ and a mean quadratic error calculation for vectors u and v. Such calculation now becomes directly feasible without it being necessary to resort to division operations.

Preferably, the following calculation is done:

$$F1 = <u,v> - K||e^{-j\Delta f 2\pi L}u-v||^2 \quad (2)$$

with $\Delta F$ being the phase correction to introduce in order to take into account the frequency shift on transmission and reception, and L being the number of samples separating vectors u and v;

with $\Delta f = \alpha \arg(<u,v>) \quad (3)$ where arg is the operator giving the argument of the scalar product and with, for example, α=½πnT with T being the clock period Detection is based on determining the sign of the result of the first cost function, as defined in formula (2) noted above. If the result is positive, a signal is detected and the estimation of the beginning of frame can be started, using a second cost function F2 without it being necessary to precisely set a threshold K as in previously known techniques. Indeed, it can be proved that the threshold K that is in formula (2) must be approximately equal to the ratio signal to the weakest noise one wants to be able to detect. For example K=1 can be set, which is a good choice.

Figure 6:
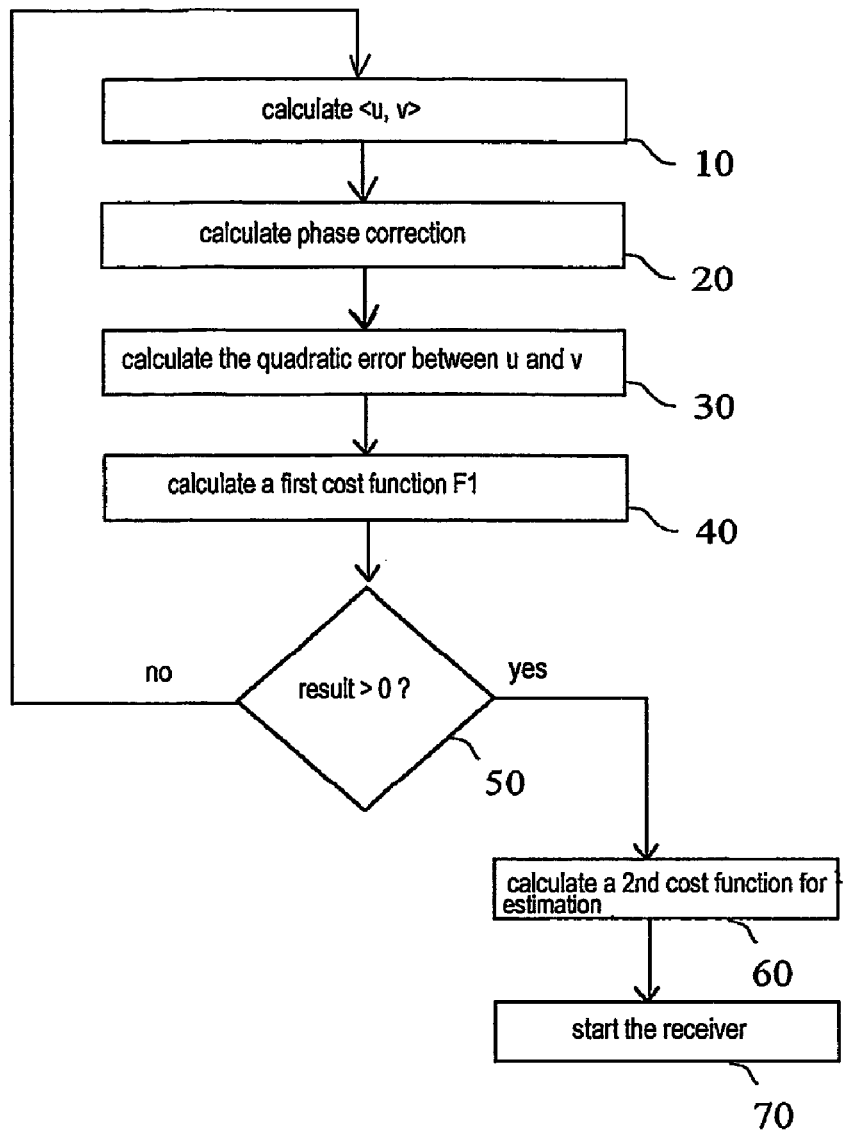
FIG. 6 illustrates a preferred embodiment of a detection method in accordance with the present invention.

FIG. 6 illustrates an embodiment of a detection method in accordance with the present invention.

In step 10, a correlation calculation is done, based on the scalar product <u, v>.

In step 20, the phase correction to be made is calculated according to formula (3).

In step 30, the mean quadratic error between periodic element u and shifted element v is calculated and then corrected by phase correction according to the formula:

$$||e^{-j\Delta f 2\pi L}u-v||^2$$

In step 40, a first cost function F1 that is the linear combination of the results of the first two functions evaluated in the previous steps 10 and 30 is calculated. Preferably, cost function F1 is calculated according to formula (2) while using a constant K that, as can be noted, does not present the critical problem of threshold determination common to all known techniques. Indeed, in the new approach as provided, the cost function is not compared with parameter K that is only used to carry out a linear combination between the correlation function and the phase-corrected mean quadratic error.

In step 50, the result of cost function F1 is compared with 0 and, when the result is positive, the process proceeds to step 60. When the value is negative, the process returns to step 10 to treat a new group of vectors u and v.

In step 60, the frame beginning is estimated using a second cost function F2. A particularly interesting possibility consists in re-using the previously calculated expression $$||e^{-j\Delta f 2\pi L}u-v||^2$$

as a cost function.

The minimum index of this cost function represents the beginning of frame and then the receiver can be started in step 70.

An advantage is observed that is particularly interesting to estimate the phase representing the modulation and demodulation clock shift between the transmitter and the receiver (Δf). In fact, what is remarkable is that the frame beginning time corresponds to the best estimate for the frequency shift (Δf). Knowing that it is calculated all the time (as required for the detection and estimation algorithm) it is then directly exploitable once the frame start time is found.

This shift is then used for rough phase correction by the system for the rest of the communication. It can be materialized by the presence of a rotor in which each sample of the received signal is phase-shifted by a value proportional to ΔF.

In practice, the frame beginning estimation can be based on two mechanisms that can be used either alternatively or jointly.

In a first mechanism, the mean quadratic error between deshifted vector u and vector v is calculated on a finished group of samples and the minimal value of these samples then makes it possible to determine the frame beginning.

In a second mechanism, the mean quadratic error between deshifted u and v is calculated as long as the first cost function F1 remains positive and the change of sign of F1 is used to determine the beginning of frame.

The invention claimed is:

1. A method for controlling a receiver in a digital communication system transmitting a frame comprising a periodic sub-set, said method comprising the steps of:
   determining a first vector u having a length n;
   determining a second vector v shifted by a whole number of periods;
   calculating a correlation between said first and second vectors;
   calculating a quadratic error between said first and second vectors;
   calculating a first cost function F1 that is a linear combination of both preceding calculations; and
   based on the sign of a result of the first cost function F1, selectively:
      calculating a second cost function F2 representative of an estimate of the beginning of the frame and determining its minimal value corresponding to the beginning of the frame; and
      starting the receiver.

2. A method for controlling a receiver according to claim 1, wherein the estimate of the beginning of the frame is carried out by using the mean quadratic error between the first vector u and the second vector v according to the formula:

$$||e^{-j\Delta f 2\pi L}u-v||^2$$

where L is the number of samples separating the vectors u and v.

3. A method for controlling a receiver according to claim 1, wherein the calculating steps comprise:
   calculating the scalar product of the first vector u resulting from an observation window having a length equal to the length of said periodic set, and of the second vector v shifted by a whole number of periods;
   calculating the phase drift ΔF resulting from the transmit and receive oscillators, according to the formula:

$$\Delta F = \alpha \arg(<u,v>)$$

with α being a constant;
   calculating the mean quadratic error according to the formula:

$$||e^{-j\Delta f 2\pi L}u-v||^2$$

with L being the number of samples separating the vectors u and v;
   calculating the first cost function F1 based on a linear combination of the scalar product and the mean quadratic error;
   comparing the result of the first cost function F1 to 0; and
   if a result of the comparison of the first cost function F1 to 0 is positive:
      calculating a second cost function determining the beginning of frame; and
      starting the receiver.

4. A method for controlling a receiver according to claim 3, wherein α is set to the value ½πnT, with T being the clock period.

5. A receiver control device for controlling a receiver in a digital communication system designed to process a frame comprising a periodic sub-set having a length n, said receiver control device comprising:
   a detector configured to:
      determine a first vector u having a length n;

determine a second vector v shifted by a whole number of periods;

calculate a correlation between said first and second vectors;

calculate a quadratic error between said first and second vectors;

calculate a first cost function F1 that is a linear combination of both preceding calculations;

based on the sign of a result of the first cost function F1, calculate a second cost function F2 for seeking a beginning time of the frame; and based on the sign of a result of the first cost function F1, start the receiver.

6. A receiver control device according to claim 5, wherein the seeking of the beginning time of the frame is carried out by using the mean quadratic error between the first vector u and the second vector v according to the formula:

$$\|e^{-j\Delta f 2\pi L}u - v\|^2$$

where L is the number of samples separating the vectors u and v.

7. A receiver control device according to claim 5, wherein the detector is configured to:

calculate the scalar product of the first vector u resulting from an observation window having a length equal to the length of said periodic set, and of the second vector v;

calculate the phase drift $\Delta F$ resulting from the transmit and receive oscillators, according to the formula:

$$\Delta F = \alpha \arg(<u,v>)$$

with $\alpha$ being a constant;

calculate the mean quadratic error according to the formula:

$$\|e^{-j\Delta f 2\pi L}u - v\|^2$$

with L being the number of samples separating the vectors u and v;

calculate the first cost function F1 that is a linear combination of the scalar product and the mean quadratic error;

compare the first cost function F1 to 0; and based on a result of the comparison of the first cost function F1 to 0, determine the beginning time of the frame by calculating a second cost function.

8. A receiver control device according to claim 7, wherein $\alpha$ is set to the value $1/2\pi nT$, with T being the clock period.

9. A receiver control device for controlling a receiver in a digital communication system designed to process a frame comprising a periodic sub-set having a length n, the receiver control device being configured to:

determine a first vector u having a length n;

determine a second vector v shifted by a whole number of periods;

calculate a correlation between said first and second vectors;

calculate a quadratic error between said first and second vectors;

calculate a first cost function F1 that is a linear combination of both preceding calculations;

based on the sign of a result of the first cost function F1, calculate a second cost function F2 for seeking a beginning time of the frame; and based on the sign of a result of the first cost function F1, start the receiver.

10. A receiver control device according to claim 9, wherein the seeking of the beginning time of the frame is carried out by using the mean quadratic error between the first vector u and the second vector v according to the formula:

$$\|e^{-j\Delta f 2\pi L}u - v\|^2$$

where L is the number of samples separating the vectors u and v.

11. A receiver control device according to claim 9, wherein the receiver control device is configured to:

calculate the scalar product of the first vector u resulting from an observation window having a length equal to the length of said periodic set, and of the second vector v;

calculate the phase drift $\Delta F$ resulting from the transmit and receive oscillators, according to the formula:

$$\Delta F = \alpha \arg(<u,v>)$$

with $\alpha$ being a constant;

calculate the mean quadratic error according to the formula:

$$\|e^{-j\Delta f 2\pi L}u - v\|^2$$

with L being the number of samples separating the vectors u and v;

calculate the first cost function F1 that is a linear combination of the scalar product and the mean quadratic error;

compare the first cost function F1 to 0; and based on a result of the comparison of the first cost function F1 to 0, determine the beginning time of the frame by calculating a second cost function.

12. A receiver control device according to claim 11, wherein $\alpha$ is set to the value $1/2\pi nT$, with T being the clock period.

* * * * *